Jan. 26, 1960 NOBUYOSHI YOSHIKAWA 2,922,233
DEVICE FOR TRAINING MARKSMANSHIP
Filed Sept. 3, 1957 3 Sheets-Sheet 1

INVENTOR.
Nobuyoshi Yoshikawa
BY Richards & Geier
ATTORNEYS

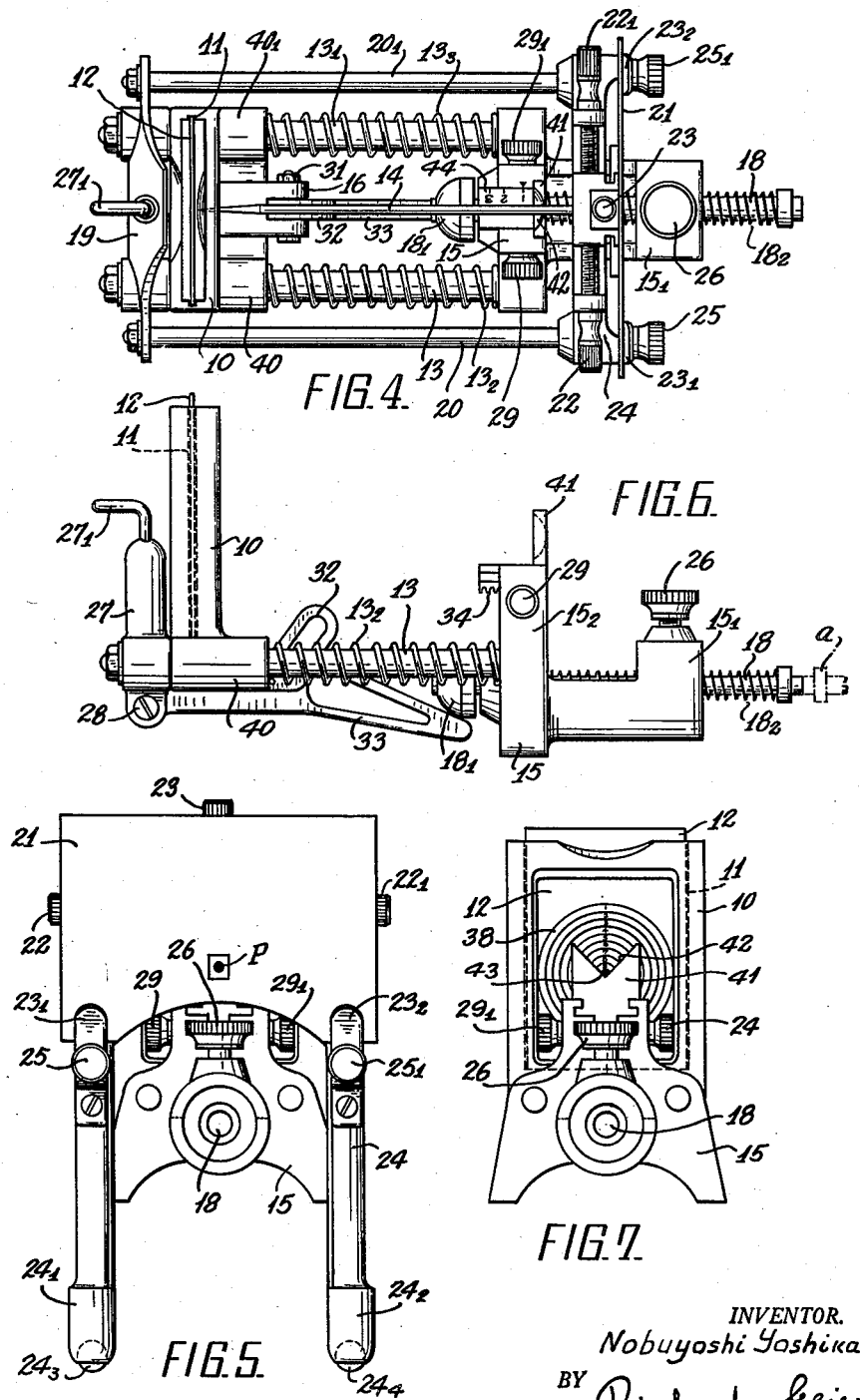

Jan. 26, 1960    NOBUYOSHI YOSHIKAWA    2,922,233
DEVICE FOR TRAINING MARKSMANSHIP
Filed Sept. 3, 1957    3 Sheets-Sheet 3

INVENTOR.
Nobuyoshi Yoshikawa
BY
ATTORNEYS

United States Patent Office 2,922,233
Patented Jan. 26, 1960

2,922,233

DEVICE FOR TRAINING MARKSMANSHIP

Nobuyoshi Yoshikawa, Tokyo, Japan

Application September 3, 1957, Serial No. 681,646

7 Claims. (Cl. 35—25)

The present invention relates to a device for training marksmanship or a rifleman training aid.

An object of the present invention is to provide a device for training marksmanship or a rifleman training aid which utilizes a special mechanism, which is simple in construction and easy to operate, to make shooting practice extremely effective.

Another object of the present invention is to provide a device for training marksmanship which can be mounted as a unit for utilization on any conventional rifle without necessitating any modification of the rifle itself and in which such training effect is expected as is more excellent than any of previous kinds of shooting practices including ball firing.

A further object of the present invention is to provide a device for training marksmanship, in which devices equivalent to the combined firing range and unlimited ammunition are incorporated in a single mechanism, firing being made after taking aim at the target mounted in the mechanism, enabling the trainee to have shooting practice while observing aiming errors or the result of his aiming by himself.

A still further object of the invention is to enable the trainee to have shooting practice in such a manner that a marking pin arranged so as to lie in parallel to the line of sight is caused to hit the target on the actuation of the percussive mechanism, thus indicating the suitability of his aiming in accordance with the extent of his aiming error.

Further objects, features and advantages of the present invention will be apparent from the following disclosures.

In the prior method of shooting practice which employs live cartridges, various facilities for the prevention of injury are necessitated in addition to a firing range and live cartridges.

The present invention contemplates the elimination of the necessity of such live cartridges, a firing range and other facilities, by the provision of a rifleman training aid or a device for training marksmanship which incorporates devices equivalent to the facilities of a firing range and an unlimited amount of ammunition in that a simple and small device is mounted on the muzzle portion of a rifle so that an impacting mechanism within the device is actuated by the firing operation so as to cause a marking pin on the mechanism to strike the target thereby to indicate the result of the operation, which training aid being thus arranged so as to enable the trainee to have the rifle leveled and take a sight for the target on the rifle at any time and anywhere, the target being arranged to be displaced and perforated by the marking pin the moment firing is made so as to enable the trainee himself to observe his aiming errors and particularly the delicate relations between the aiming and the percussion, thus enabling him to have shooting practice similar to that requiring a firing range and ammunition, said device for training marksmanship or rifleman training aid being characterized in that it comprises a percussive mechanism and a sighting mechanism comprising a portal frame connected to a target frame carrying a target and riding over said percussive mechanism, an impact transmitting rod of said percussive mechanism acting to displace the target under the impact from percussion, the target being also arranged to strike a marking pin associated with the sighting mechanism. Further, in accordance with the present invention, means is provided comprising a marking pin which is arranged to lie in parallel with the line of sight so as to indicate the suitability of aiming in accordance with the extent of errors and, if necessary, further to indicate the errors in an enlarged scale, and thus the present training aid has a wider range of usefulness for riflemen from novices to experts, in which case the shooting range is increased. The reason is that shooting errors are advantageously indicated in an enlarged scale particularly for skilled riflemen since the aims taken by them are approximately correct involving only minute errors.

Furthermore, the training device or training aid in accordance with the present invention has various advantageous features in that it is compact, light-weight, not obstructive to the operation of the rifle, simple in construction, sturdy with no danger of being damaged, and also has an advantage that it can be disassembled and contained in a compact case and thus is suitable for carrying about.

In order that the present invention may be clearly understood and readily carried into effect, an embodiment thereof will now be described with reference to the accompanying drawings, in which Fig. 1 is a side elevational view of the present device for training marksmanship or rifleman training aid mounted on a conventional rifle;

Fig. 4 is a plan view of same;

Fig. 5 is a front elevational view of the entire structure comprising in combination a sighting member and a percussive member;

Fig. 6 is a side elevational view of the construction of a portion of the percussive mechanism;

Fig. 7 is a front view of same;

Figure 1:
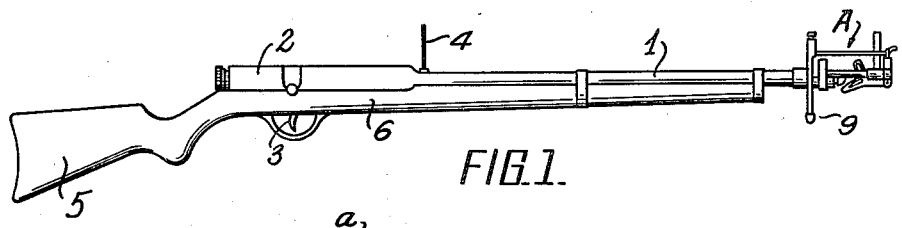

Referring to Fig. 1 which shows the manner in which the device for training marksmanship in accordance with the present invention is attached as a unit onto the muzzle of a conventional rifle; numeral 1 denotes a rifle barrel, 2 a breechblock, 3 a trigger, 4 the notch of a backsight, 5 a grip, 6 a rifle-stock, and A indicates generally the present device for training marksmanship, 9 designating a support for mounting the muzzle and the present training device attached thereto on a stand (not shown).

When, with the present training device attached onto the muzzle, the trigger 3 is pulled for firing as in a usual rifle, the firing pin strikes the rear end of a transmission rod inserted in series and in alignment into the rifle barrel bore. Thus, the impact of the firing pin is transmitted to the transmission rod, which in turn operates to strike the actuating member of the present training device.

Figure 2A:
Figs. 2A, 2B and 2C are fragmentary side elevational views respectively showing one of rod sections of a transmission rod to be inserted into the rifle barrel bore, a series of the transmission rod sections connected to each other, and a rod section opposite to the firing pin.
Figure 2B:

The transmission rod comprises a plurality of rod sections $a, a, a \ldots$ and $a$ as shown in Fig. 2A and connected in series as shown in Fig. 2B; said transmission rod can conveniently be divided into respective rod sections as required for the convenience of carrying about and housing thereof, each of the rod sections $a$ being provired at both the front and rear ends thereof with collars 7 and $7_1$ respectively so as to place the transmission rod and the barrel bore in alignment with each other for smooth sliding movement of the former in the barrel bore. In order accurately to transmit the impact of the firing for the perfect functioning of the transmission rod, the latter is required to have a proper length, and also since the rear end portion of the transmission rod section which is subjected to the impact of the firing pin is likely to be worn and deformed due to the impact, the total length of the transmission rod and the impairment and deformation of such struck portion must always be examined for adjustment.

Figure 2C:
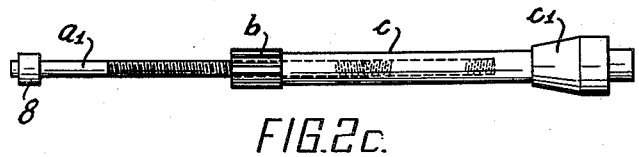

Fig. 2C shows the end section of the transmission rod opposite the firing pin adapted to meet the aforesaid requirements, the rod section being threaded interiorly and exteriorly thereof as shown in the drawing, that portion of the section which is directly subjected to the striking, i.e., a firing pin receiving portion also being threaded for connection so that it may conveniently be replaced by a spare part when impaired. In the figure, $a_1$ denotes a threaded inner rod constituting the rearmost section of the transmission rod and carrying at its forward end a collar 8. $c$ denotes an outer rod, $b$ a clamping screw provided on said outer rod, and $c_1$ said firing pin receiving portion. These rod sections $a, a, a \ldots$ and $a_1$, which constitute a transmission rod, serve only to transmit the impact of the firing pin and hence need not be firmly connected to each other, but are only required to be in contacting connection with each other.

Figure 3:
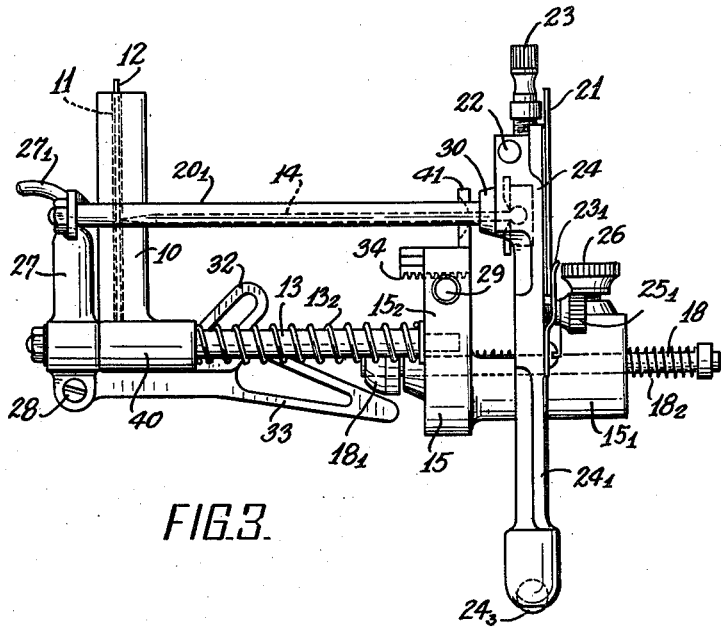
Fig. 3 is a side elevational view showing the construction of the entire structure in combination of an impacting mechanism and a sighting mechanism of the training device in accordance with the present invention.

The construction of the present training device will now be described in connection with Figs. 3 to 5. At first, the construction of the sighting mechanism of the device will be described in connection with the figures. In Figs. 3 to 5, $24_1$ and $24_2$ denote respectively frame legs of a portal frame for sighting 24. 20 and $20_1$ are horizontal supporting rods therefor, which are secured at respective forward ends thereof to said portal frame member 24 and connected at the rear ends to a hook $27_1$ through a connecting piece 19 (see Fig. 4). Thus, the portal frame for sighting 24 has its leg members $24_1$ and $24_2$ resting upon a suitable stand and thus rides over the percussive member. This portal frame 24 has, as shown in Fig. 5, a sighting target plate 21 secured to the front upper portion of the portal frame 24 by screws 25 and $25_1$ through stops $23_1$ and $23_2$, said plate having a sighting point P carried on the face thereof. 22 and $22_1$ denote screws for adjustment of the lateral position of the sighting target plate 21, and 23 a screw for vertical adjustment thereof. Fixed on the lower ends of frame legs $24_1$ and $24_2$ of said portal frame 24 are sliding rollers $24_3$ and $24_4$.

In this way the sighting target plate 21 attached to the portal frame 24 is disposed stationarily, the rifleman being required to take an accurate and stable sight for the sighting point P carried on this target plate.

The percussive mechanism is shown in Fig. 6 wherein the numeral 15 denotes a supporting member which has an inverted L-shaped extended projecting portion $15_1$, a bore formed in said portion defining a hole for the insertion of an impact transmitting rod 18 and the muzzle of a rifle. 26 denotes a screw for clamping the muzzle fitted within said hole, $15_2$ a support for a marking pin bearing portion in the upper portion of said supporting member 15 and 41 said marking pin bearing portion which has a V-shaped notch 42 formed on the top thereof, 43 denoting a bottom point of the notch 42 (see Fig. 7). The said impact transmitting rod 18 has a spring $18_2$ wound thereon and a cap $18_1$ fixed on the extreme end of this transmitting rod 18, which cap is able to jut out against the tension of the spring $18_2$ when the rear end portion of the impact transmission rod 18 receives an impact due to the percussion of the firing pin through the transmission rod within the barrel bore (see Fig. 2). Further, 11 denotes a groove provided in said target frame 10 for the longitudinal insertion of a target paper 12. 13 and $13_1$ connecting rods respectively having coil springs $13_2$ and $13_3$ wound thereon and mounted horizontally in parallel with each other through movable carriers 40 and $40_1$ supporting said target frame 10, the supporting member 15 in the rear on the one hand and the support 27 in the front on the other hand being firmly connected as described above by said connecting rods 13 and $13_1$. $27_1$ is, as described hereinbefore, a hook attached to said support 27. The target frame 10 is mounted on the said carriers 40 and $40_1$ slidable on these connecting rods 13 and $13_1$ and is normally urged into contact with the base portion of the support 27 by the resiliency of the springs $13_2$ and $13_3$.

The numeral 16 denotes a projection from the base portion of the target frame 10 formed integrally with the aforesaid carriers 40 and $40_1$, 33 a specially shaped engaging member journaled at the extreme end thereof by a pivot pin 28 in the bottom end of the said support 27, and which member rests normally against the surface of the aforesaid cap $18_1$, but when the impact transmitting rod 18 receives the impact through the medium of the transmission rod so that the cap $18_1$ juts out, the said engaging member 33 is forced to rotate about the pivot pin 28 by the impact of said cap $18_1$ while at the same time the target frame 10 is backwardly retracted (toward the rifleman) in a manner as will be described hereinafter.

Figure 8:
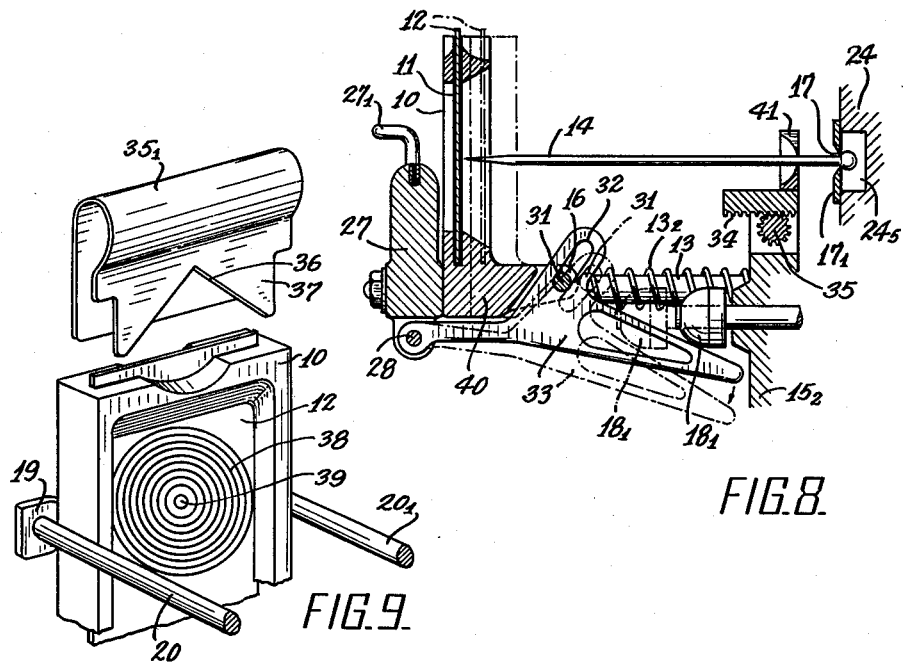
Fig. 8 is a side elevational view showing a portion of an engaging mechanism.

The construction of this engaging mechanism is shown in Fig. 8 wherein 31 denotes a shaft secured to the projection 16 from the base portion of the target frame 10 and fitting in an elongated hole 32 formed in said engaging member 33 for rotation about said pivot pin 28. The chain lines in the Fig. 8 show the displaced position of the target frame 10 and the rotated position of the engaging member 33 when the engaging member 33 is subjected to impact by the cap $18_1$, the arrow indicating the direction of said rotation.

In the drawings, 14 denotes a marking pin the axis of which pin 14 is adjusted so as to lie on the straight line connecting the target 38 of the target paper 12 with the sighting point P on the sight target plate 21. The direction of the barrel 1 runs in parallel with and below the direction of the axis of the marking pin 14 as described further hereinafter.

Thus, when the engaging member 33 rotates, as described hereinbefore, about the pivot 28 under the impact of the cap $18_1$, the movable carriers 40 and $40_1$ which together carry the target frame 10 are retracted instantaneously against the spring pressure of the springs $13_2$ and $13_3$ so that the target 38 on the target paper 12 previously inserted into the groove 11 of the target frame 10 is caused to be stricken or pierced by the pointed end of the marking pin 14, thus the point of sight of the rifleman being indicated as a perforation on said target so that the rifleman can readily known the suitability of his sighting by the sticken point. Thus, the shooting practice can be carried out as desired by repeating such operation.

The said marking pin 14 is displaceably supported at the rear end thereof by the supporting hole 17 formed in a supporting plate $17_1$ which is secured to the front face of the portal sighting frame 24 to cover a recess $24_5$ formed in the front face of the said frame 24 and housing the extremely rear end of the marking pin 14 therein and also is supported by the V-shaped notch 42 formed on the marking pin bearing portion 41 of the carrier 15, the pointed end of this marking pin 14 being directed toward the target in the target frame 10 as set forth above.

29 and $29_1$ denote finger pieces on respective ends of a toothed bar 35 in mesh with a rack 34 provided at the base portion of the marking pin bearing portion 41, and these finger pieces may be rotated to bring the said toothed bar 35 and the rack 34 into engagement with each other to cause said marking pin bearing portion 41 to be displaced forwardly and rearwardly. In addition, in order to adjust precisely the above displacement, a graduation 44 is provided on the surface of the rack 34.

Figure 9:
Fig. 9 is a perspective view showing a regulator plate for the adjustment of the line of sight and a target frame.

It will be apparent that this marking pin 14 should be adjusted beforehand so that if the line of sight of the rifleman is proper and correct the marking pin 14 is infallibly directed toward the center of the target 38. Fig. 9 shows the relationship between the regulator plate $35_1$ for the adjustment of the line of sight and the target frame 10, the regulator plate $35_1$ being composed of a sheet of plate which is bent into inverted U shape in section and provided at the bottom end of the forward leg portion 37 with an inverted V-shaped notch 36; both of the leg portions of the plate $35_1$ can be properly fitted in the target frame 10 so as to put the vertex of the notch 36 of the leg portion 37 in registry with the center 39 of the target 38 on the target paper 12.

Since the pointed end of the marking pin 14 should be in such position as corresponds to the point of registry as just described as long as the sight is taken properly, the sighting target is adjusted to the normal position on this basis.

Furthermore, since the target paper 12 is, in a manner described above, pierced by the pointed end of the marking pin 14 each time firing is effected, preferably it is conveniently replaced by one of spare sheets provided beforehand.

Since the present rifleman training device in accordance with the present invention is constituted as set forth above, when this device is attached to the muzzle of the rifle as shown in Fig. 1 and placed with the frame legs $24_1$ and $24_2$ of the portal sighting frame 24 on an appropriate stand, the percussive member is freely movable both horizontally and vertically together with the muzzle, enabling the rifleman to place the pointed end of the marking pin 14 in registry with the center point 39 of the target paper by taking sight at the central point P of the sighting target plate 21.

Furthermore, since the axis of the marking pin 14 is adjusted in advance so as to lie on the straight line connecting the center of the target 38 of the target paper 12 with the center of the sighting point P on the sight target plate 21, and the rifle has the muzzle or the extreme end of the barrel thereof fitted in the hollow portion in the projection $15_1$ of the carrier 15, the direction of the barrel 1 is brought into registry with the direction of the axis of the marking pin 14 when the rifleman applies the rifle stock 6 onto his shoulder with the frame legs $24_1$ and $24_2$ resting on a suitable supporting base and a sight is taken at the center of the sighting point P of said sighting target plate 21 through the notch of the backsight. Thus, the center of said point P, the axis of the marking pin 14 and the center of the target 38 lie then in a straight line which is in registry with the direction of the barrel. However, the extension of the line of the barrel runs in parallel with and below the axis of the marking pin 14 as already referred to hereinbefore. Thus, according to the present invention, the accuracy of sighting at the target can be determined by the direction of the barrel and hence when the rifleman pulls the trigger while accurately sighting at the center of said point P the center of the target 38 is broken by the pointed end of the marking pin 14. Accordingly, the examination of the target 38 after the shooting will reveal the perforation in the center of the target thereby the rifleman being able to observe the result of the shooting. However, even when the rifleman takes sight correctly at the center of the target, the deviation of the sighting due to the deflection of the rifle barrel caused by the swing of the rifleman's shoulder and other causes at the moment when the trigger is pulled imparts corresponding deviation to the perforation made in the target 38 of the target paper 12 by the marking pin 14 in the direction of the rifle barrel at the moment. Therefore, by examining the perforation made in the target the extent and the manner in which the sighting at the time has been disturbed can be known. By repeating such shooting practice the rifleman can know the extent of the inaccuracy of his sighting each time he shoots, thus greatly increasing the effectiveness of the shooting practice.

In this connection, when the sighting is improper and even slightly deflected, the degree of deflection is enlarged in accordance with the relative distances between the pointed end of the marking pin 14 and the vertex 43 of the notch in the marking pin bearing portion 41 and the marking pin support, and the pointed end of the marking pin 14 is displaced accordingly so that eventually it is possible to show slight errors in a scale enlarged to such an extent as is physically possible. In other words, riflemen including novices and skilled marksmen can do shooting practice fitted to their respective abilities by adjusting the present training aid.

Figure 10:
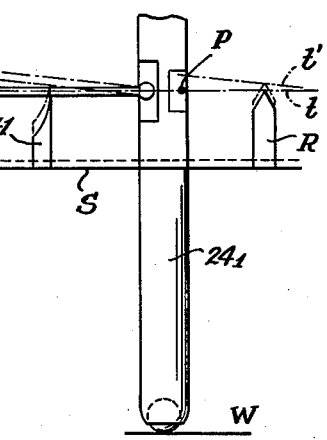
Figs. 10 and 11 are explanatory drawings showing the relationship between the marking pin and the line of sight.

Fig. 10 is an explanatory drawing which illustrates schematically the vertical deflection of the line of sight in an enlarged scale and in which a chain line $t$ indicates a correct line of sight while other chain line $t'$ indicates the line of sight displaced upwardly. Also, P indicates the target point of sighting, 14 the marking pin positioned in accordance with the proper line of sight, 14a the marking pin positioned in accordance with the line of sight displaced upwardly, R the foresight, S upper marginal line of the rifle barrel, a dotted line drawn above the line S denotes an incorrect position of the upper marginal line of the rifle barrel in a case where sighting is not accurate, and both of these lines correspond respectively to the aforesaid lines $t$ and $t'$, 41 the marking pin bearing portion, $24_1$ the frame leg of the portal sighting frame 24, and W a supporting stand. The reason why the marking pin 14 assumes the position 14a with respect to the target when sighting is inaccurate, as shown in Fig. 10, can be illustrated as follows: the reference $t$ denotes an accurate or correct line of sight; $t'$ denotes a line of sight displaced upwardly, i.e. in a case where the line of sight is not accurate; S a rifle barrel in a case corresponding to said line $t$; a dotted line above line S is a rifle barrel in a case corresponding to said line $t'$; 14 is the marking pin in a case corresponding to the line $t$ and 14a is the marking pin in an incorrect position in a case corresponding to the line $t'$, in other words 14a is an inaccurate position assumed by the marking pin 14 when sighting is inaccurate.

After the device of the present invention has been placed on a trainee's shoulder, the pointed end of the pin 14 is directed toward the target paper 38 by means of the regulator plate $35_1$. The sighting target plate 21 is moved up and down as well as right and left by the operation of the screws 22, $22_1$ and screw 23 which is used for vertical adjustment of the target plate 21 so that the sighting point P on the sighting target plate 21 accurately lies on the line of sight of the rifle. Then the target plate 21 is tightly clamped by screws 25 and $25_1$ so that said plate cannot displace. Thereafter, said regulator plate $35_1$ is taken away.

Aiming at the point P is effected after the frame legs $24_1$ and $24_2$ of the portal sighting frame 24 have been placed in a position on a supporting stand. When the line of sight is accurately directed toward said point P, i.e. when the line of sight assumes the position of line $t$, the supporting member 15 fitted on the muzzle receives the marking pin 14 at its marking pin bearing portion 41 and the pin assumes the position 14 as shown in Fig. 10 and the pointed end of said pin 14 is accurately directed toward the center 39 of the target paper 38.

Figure 11:
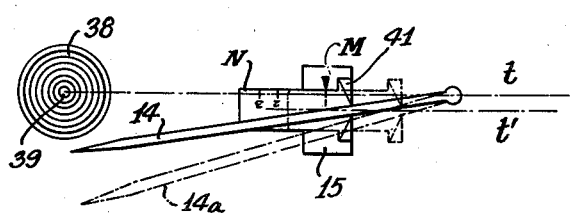

If the line $t$ is displaced to the line $t'$, the line S moves to the dotted line thereabove, as shown by the dotted line in Fig. 10, and the marking pin bearing portion 41 is raised upwardly somewhat and consequently, the pin 14 is also raised to assume the position 14a. Thereby, the pointed end of the pin 14 is directed toward a position far remote from the center 39 of the target paper 38. The marking pin 14 is received at its other end by the supporting hole 17 formed in the supporting plate 17₁ so as to move freely up and down as well as right and left. This end of the pin 14 does not displace even when the portal frame 41 is raised upwardly, and only the pointed end of said pin 14 is raised. The magnitude of movement of the pointed end of pin 14 can be enlarged as a proportion of the total length of pin 14 to the distance between the portal frame 41 and the supporting hole 17 and therefore, the minute deviation or displacement of the muzzle or of the line of sight can be indicated to an enlarged scale. This enlargement is applicable in the up-and-down directions as well as in the right and left directions. Consequently, judging from the position of the pointed end of the marking pin 14, it can be seen where the line of sight is being aimed or whether the rifle is in a stabilized position or not. Particularly, the state of aiming at the moment of percussion can clearly be known and this of course, is the life and soul of marksmanship. Fig. 11 is an illustration in connection with the directional deviation of the manner in which the ratio of magnification of the deflection of the marking pin varies in accordance with the variation of the shooting distance which varies with the grade of ability, wherein N denotes a scale plate, M a pointer for the scale, t, t', 38, 14 and 14a the same parts as those in Fig. 10. In both of Figs. 10 and 11 the chain line indicates the line of deflection. It can be observed from these two figures that slight differences in the direction of the line of sight displace the marking pin in an anlarged scale. Also it is apparent that the ratio of magnification can further be adjusted by adjusting beforehand displacement for the position of the marking pin bearing portion in accordance with the graduation of the scale plate.

Thus, according to the present invention shooting practices equivalent to ball firings can be expected without employing live cartridges and that such practices can be had in a room so that it also can characteristically be utilized in sports with interest.

It is obvious that the present training device can also be utilized for pistols.

What I claim is:

1. A device for developing marksmanship in the use of a weapon having a barrel and a firing pin, said device comprising an impact transmitting rod, a series of interengaging transmission rods having an end actuated by the firing pin and another end engaging said impact transmitting rod, a supporting member having an extended projecting portion, said portion having formed therein a bore receiving the muzzle of the barrel and said impact transmitting rod, connecting rods connected with said supporting member, carriers movably mounted upon said connecting rods, a support, coiled springs surrounding said connecting rods and pressing said carriers against said support, a target frame carried by said carriers, a cap carried by said impact transmitting rod, a swingable engaging member pivotally mounted in said support and engaging said cap, means connected with said swingable member for displacing said carriers and the target frame carried by said carriers when said swingable member is actuated by the cap of said impact transmitting rod upon the firing of said firing pin, a marking pin indicating the sighting direction of the barrel and having an end located adjacent said target frame, and a mechanism connected with said supporting member and engaging said marking pin for causing the direction of said marking pin to register with that of the barrel.

2. A device in accordance with claim 1, comprising a coiled spring enclosing said impact transmitting rod, and wherein said support has a lug upon the bottom rear portion thereof, said swingable engaging member being pivotally mounted in said lug.

3. A device in accordance with claim 1, wherein said displacing means comprise a projection at the base of said target frame and a rotatable shaft carried by said projection and extending through an elongated opening formed in said swingable engaging member.

4. A device for developing marksmanship in the use of a weapon having a barrel and a firing pin, said device comprising an impact transmitting rod, a series of interengaging transmission rods having an end actuated by the firing pin and another end engaging said impact transmitting rod, a supporting member having an extended projecting portion, said portion having formed therein a bore receiving the muzzle of the barrel and said impact transmitting rod, and a pin bearing support; a pin bearing member carried by said pin bearing support, a marking pin indicating the sighting direction of the barrel, means connected with said supporting member for supporting one end of said marking pin for free swinging movement, said marking pin being carried intermediate its ends by said pin bearing member, means connected with said pin bearing member for shifting it relatively to said supporting member to cause the direction of said marking pin to register with that of the barrel, connecting rods connected with said supporting member, carriers movably mounted upon said connecting rods, a support, coiled springs surrounding said connecting rods and pressing said carriers against said support, a target frame carried by said carriers, a target carried by said target frame, said marking pin being pointed at its other end the latter end being located adjacent said target, a cap carried by said impact transmitting rod, a swingable engaging member pivotally mounted in said support and engaging said cap, and means connected with said swingable member for displacing said carriers, said target frame and said target toward said marking pin to cause said pointed end of the marking pin to pierce said target when said swingable member is actuated by the cap of said impact transmitting rod upon the firing of said firing pin.

5. A device in accordance with claim 4, wherein said pin bearing member has a V-shaped notch formed therein, said marking pin being carried upon the bottom of said notch, said device further comprising a regulator plate fitting upon said target frame and having the shape of an inverted U, said regulator plate comprising a forward leg portion having an inverted V-shaped notch formed therein, the vertexes of the V-shaped notches of said pin bearing member and of said regulator plate regulating the line of sight.

6. A device for developing marksmanship in the use of a weapon having a barrel and a firing pin, said device comprising an impact transmitting rod, a series of interengaging transmission rods having an end actuated by the firing pin and another end engaging said impact transmitting rod, a portal frame having frame legs for supporting the device, a supporting member connected with said portal frame and having an extended projecting portion, said portion having formed therein a bore receiving the muzzle of the barrel and said impact transmitting rod, connecting rods connected with said supporting member, carriers movably mounted upon said connecting rods, a support, coiled springs surrounding said connecting rods and pressing said carriers against said support, a target frame carried by said carriers, a target carried by said target frame, a cap carried by said impact tansmitting rod, a swingable engaging member pivotally mounted in said support and engaging said cap, a marking pin indicating the sighting direction of the barrel and having a pointed end located adjacent said target, means connected with said swingable member for displacing said carriers, said target frame and said target toward said marking pin to cause said pointed end of the marking pin to pierce said target when said swingable member is actuated by the cap of said impact transmitting rod upon the firing of said firing pin, and a mechanism connected with said portal frame and said supporting member and engaging said marking pin for causing the direction of said marking pin to register with that of the barrel.

7. A device in accordance with claim 6, wherein said target consists of a sheet of paper carrying target indicia thereon, said target frame having a groove formed therein and receiving said target, and wherein said mechanism comprises a portion of said portal frame having formed therein an opening located opposite said target and enclosing a rounded end of said marking pin.

References Cited in the file of this patent

UNITED STATES PATENTS

| | | |
|---|---|---|
| 926,541 | Bolitho | June 29, 1909 |
| 2,349,615 | Lubicz-Bakanowski et al. | May 23, 1944 |
| 2,350,750 | Gerstenberger | June 6, 1944 |
| 2,353,516 | Sochaczewski | July 11, 1944 |
| 2,571,511 | Winter | Oct. 16, 1951 |

FOREIGN PATENTS

| | | |
|---|---|---|
| 540,079 | Great Britain | Oct. 3, 1941 |